United States Patent
Ackerman

(10) Patent No.: US 7,460,247 B1
(45) Date of Patent: Dec. 2, 2008

(54) FULL SPECTRUM OPTICAL SAFEGUARD

(75) Inventor: Mark R. Ackerman, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 133 days.

(21) Appl. No.: 11/135,865

(22) Filed: May 23, 2005

(51) Int. Cl.
*G01B 9/02* (2006.01)
(52) U.S. Cl. ................................. 356/519; 359/577
(58) Field of Classification Search ............. 356/480, 356/519; 359/589, 590
See application file for complete search history.

(56) References Cited

U.S. PATENT DOCUMENTS

| | | | | |
|---|---|---|---|---|
| 4,790,634 | A * | 12/1988 | Miller et al. | 349/198 |
| 4,854,676 | A * | 8/1989 | Kalyanaraman et al. | 359/243 |
| 5,491,579 | A * | 2/1996 | Justus et al. | 359/241 |
| 5,872,655 | A * | 2/1999 | Seddon et al. | 359/588 |
| 6,256,328 | B1 | 7/2001 | Delfyett et al. | |
| 6,636,666 | B2 * | 10/2003 | Chan et al. | 385/37 |
| 6,700,690 | B1 * | 3/2004 | Buchsbaum et al. | 359/230 |
| 6,711,203 | B1 | 3/2004 | Garnache et al. | |
| 6,791,758 | B1 | 9/2004 | Scobey | |
| 6,816,534 | B2 | 11/2004 | Flint et al. | |
| 6,822,986 | B2 | 11/2004 | Nasu et al. | |
| 6,842,217 | B1 | 1/2005 | Miller et al. | |
| 6,909,548 | B2 * | 6/2005 | Duggan | 359/578 |
| 2002/0113974 | A1 * | 8/2002 | Clark | 356/519 |
| 2003/0025963 | A1 * | 2/2003 | Park et al. | 359/124 |
| 2003/0035121 | A1 * | 2/2003 | Nebendahl et al. | 356/519 |
| 2004/0057144 | A1 * | 3/2004 | Lewis et al. | 359/891 |
| 2005/0068541 | A1 * | 3/2005 | Gunning et al. | 356/519 |

* cited by examiner

*Primary Examiner*—Tarifur Chowdhury
*Assistant Examiner*—Jonathan M Hansen
(74) *Attorney, Agent, or Firm*—Elmer A. Klauetter

(57) ABSTRACT

An optical safeguard device with two linear variable Fabry-Perot filters aligned relative to a light source with at least one of the filters having a nonlinear dielectric constant material such that, when a light source produces a sufficiently high intensity light, the light alters the characteristics of the nonlinear dielectric constant material to reduce the intensity of light impacting a connected optical sensor. The device can be incorporated into an imaging system on a moving platform, such as an aircraft or satellite.

10 Claims, 7 Drawing Sheets

FULL SPECTRUM OPTICAL SAFEGUARD

This invention was made with Government support under Contract No. DE-AC004-94AL85000 awarded by the Department of Energy. The Government has certain rights in the invention.

BACKGROUND OF THE INVENTION

The invention describes an imaging device and, more particularly, an imaging device that incorporates Fabry-Perot etalon filters that serve to protect against high-intensity optical transients.

A Fabry-Perot etalon is an example of an optical filter. A Fabry-Perot etalon is an optical device that can transmit light at a series of discrete wavelength bands. Light entering the Fabry-Perot etalon enters an optical cavity that is bounded by a pair of reflective surfaces. The reflective surfaces are separated by a precisely controlled distance that determines a set of transmission wavelengths for the filter. The transmission properties of a Fabry-Perot etalon are dependent on parameters such as the reflectivity of the reflective surfaces and the separation of the reflective surfaces. For example, the higher the surface reflectivity, the narrower the transmission bands. Also, the smaller the separation, the further apart the transmission bands are in wavelength. That is, the smaller the separation, the larger the free spectral range (FSR) of the filter.

A tunable Fabry-Perot etalon adds an adjustable component to the separation by which the peak wavelengths of the transmission bands can be changed. Tuning can be achieved in a Fabry-Perot etalon by making one of the two reflectors a movable or deformable membrane and applying a voltage between the membrane and the second fixed reflector, thereby changing the cavity separation distance through electrostatic attraction. In such a device, the amount of deflection and, therefore, cavity length control, is dependent upon the distance between the reflectors and the level of the applied voltage.

In addition to depending on the separation of the reflective surfaces, the peak transmission wavelengths also depend on the refractive index of the medium between the reflective surfaces. Thus, a tunable Fabry-Perot etalon can also be achieved by including between the reflective surfaces a material with a variable refractive index. An example of such a material is a liquid crystal, which can change refractive index in response to an electric field.

A Fabry-Perot etalon (etalon, resonator or cavity) consists of two parallel, highly reflective surfaces separated by a dielectric. When light strikes the Fabry-Perot etalon near normal incidence, most of the light is reflected, up to 99.9% or more, as known in the art and illustrated in FIG. 1. A very small fraction of light 13 incident on one of the high reflective surfaces 11 is transmitted into the cavity 12. Within the cavity, this light reflects off the second reflective surface 14 and most of it is reflected back through the cavity body. Only a very small fraction is transmitted out the other side.

For most wavelengths (colors) of light, the optical energy in the cavity bounces around a few times and dies out. However, at specific wavelengths, the light bouncing off the mirrors in the cavity is exactly in phase with the light leaking through the mirror to enter the cavity. Being in phase, these light beams add in quadrature (the electric fields of the light waves add linearly). As the reflection process continues, these waves continue to add until the optical intensity within the cavity is much higher than that incident on the etalon surface, as much as 1000 times or higher more intense in the case of the 0.999 reflective mirrors. Subsequently, the light escaping from the cavity through the second mirror can now be equal in intensity to the incident light. At specific wavelengths that are resonant wavelengths, the near perfect mirrors and dielectric cavity can thus combine to pass essentially 100% of the incident light. Therefore, in these devices, resonant wavelengths can be transmitted through the device with the intensity within the cavity much higher than the intensity incident on the device, while non-resonant wavelengths are reflected.

In one example of such a device, a rainbow of light 15 is incident on one mirror of a Fabry-Perot etalon 10, as illustrated in FIG. 2. If the etalon is tuned to be resonant at a particular wavelength, for example a wavelength of 532 nm (green), then all of the colors of the rainbow are blocked except light very near 532 nm in wavelength. That light wavelength alone 16 is transmitted through the etalon at any significant intensity.

A linear variable filter is a filter which transmits different colors at different position along the length of the filter. At one end, the filter may transmit one color (wavelength), in the middle, another color, and at the other end still another color. For example, a filter can be produced which transmits red at one end, green in the middle and blue at the other end.

A linear variable filter can be made from a Fabry-Perot etalon by changing the thickness of the cavity dielectric as a function of position along the length of the filter. In a linear variable filter made from a Fabry-Perot etalon, referred hereinafter as a linear variable Fabry-Perot etalon, the dielectric material at one end is thicker and will be resonant for longer wavelengths (such as for redder light). At the other end, the dielectric is thinner and will be resonant for shorter wavelength light (such as for bluer light).

FIG. 3 illustrates a linear variable filter 18 made from a Fabry-Perot etalon of linearly increasing thickness. White light 17, which contains all colors, is incident on the filter. A rainbow of colors 15 is therefore transmitted from the filter, but note that each color is transmitted at only one location, the location where that color is resonant and hence passes through the filter. All other light is reflected (but not shown in the illustration).

A Fabry-Perot etalon can also be constructed with a nonlinear optical dielectric material. This type of etalon is similar to that illustrated in FIG. 2, except the standard optical dielectric material is replaced with one which is known to have a high nonlinear index of refraction. These materials behave normally at when exposed to low intensity light, even concentrated sun light, but when exposed to very high intensity light such as that from a powerful laser, the index of refraction changes slightly due to its nonlinear properties. Whether the input light source is a white light or a monochromatic laser or other source, if the light is of the proper wavelength to be resonant with the cavity at the area upon which the source is incident, the light of that wavelength will pass through the cavity; otherwise, it is reflected.

With a nonlinear dielectric material, low intensity resonant light can be passed through the cavity. However, when exposed to high intensity light such as that from a powerful laser, the high intensity optical fields activate the nonlinear index of refraction and thereby change the overall index of refraction for the dielectric material in the cavity at the location of the intense light. This changes the resonant wavelength for the cavity to make it non-resonant for the original laser and therefore makes the cavity unable to pass more than a small fraction of this high-power laser.

A device can also be fabricated with a nonlinear dielectric material such that, when exposed to a low intensity laser light at a resonant wavelength, the device allows light transmission of that wavelength light. However, is the device is exposed to a high intensity laser at the resonant wavelength, the high intensity laser changes the nonlinear index of refraction of the cavity, resulting in only a small fraction of light of that wavelength to be transmitted. Similarly, for the same cavity, if a low intensity laser is used with a wavelength slightly different from the resonant wavelength, no significant light will be transmitted through the device. However, the device could transmit light when a high intensity laser is used with a wavelength slightly different from the resonant wavelength of the dielectric material as the high intensity laser will alter the index of refraction and thus the resonant frequency of the material, thus allowing efficient transmission of light at a slightly different wavelength.

BRIEF DESCRIPTIONS OF THE DRAWINGS

DESCRIPTION OF SPECIFIC EMBODIMENTS

The full-spectrum optical safeguard device of the present invention provides spatial and wavelength dependent optical limiting for high-intensity optical signals that might damage or otherwise interfere with proper operation of the light sensitive focal plane array. This, however, does not allow for normal imaging operations as different spatial bands in the image will be recorded at different wavelengths. The solution is to couple the full-spectrum optical safeguard technology with a push-broom type imager commonly found on moving platforms such as imaging aircraft. The motion of the platform makes different parts of the image drift across the focal plane array. If the focal plane array is clocked to shift image pixels at the same rate as the image is moving, the result in known as time-delay integration (TDI). By combining a moving platform with TDI operation and the wavelength/position dependent image characteristics of the full-spectrum optical safeguard device, a full pan-chromatic image of the scene can be obtained while operating with an optical system protected against high-intensity optical transients.

The optical safeguard device of the present invention comprises two filters and an optical sensor. The filters are linear variable Fabry-Perot filters optically aligned such that light impacting the surface of the first filter is transmitted to the second filter and subsequently to the optical sensor. The filters selectively pass light depending on the light's wavelength, position and intensity. Light incident on the surface of the first filter originates from a light source that can be a white light source or a monochromatic light source, such as a laser. The light source is generally aligned such that the transmitted light is approximately orthogonal to the surface of the filter the light is incident upon. The filters can comprise a nonlinear dielectric constant material, meaning that the material dielectric constant characteristics can be altered when the material is impacted by a light of sufficient intensity. Therefore, the device can function to reject high intensity light while allowing low intensity to pass, preventing damage to the optical sensor. The optical sensor is typically a charge-coupled device. Hereinafter, high intensity light refers to light that can either damage an optical sensor or that can alter the dielectric constant characteristics of a nonlinear dielectric constant material in a filter used in the device of the present invention.

Figure 2:
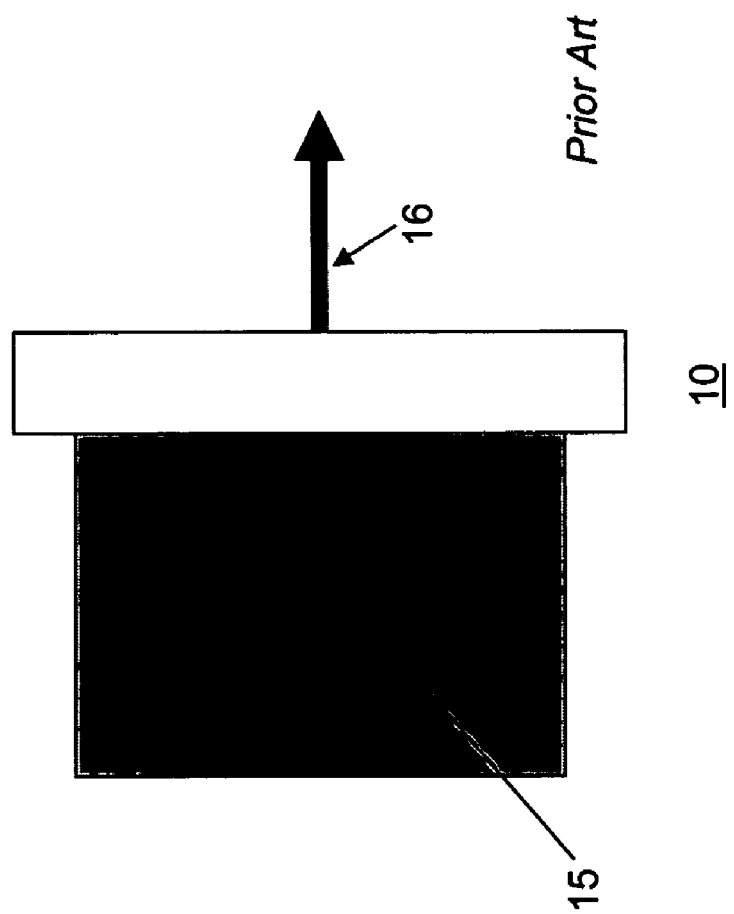
FIG. 2 illustrates a prior art Fabry-Perot filter impacted by a white light source.
Figure 1:
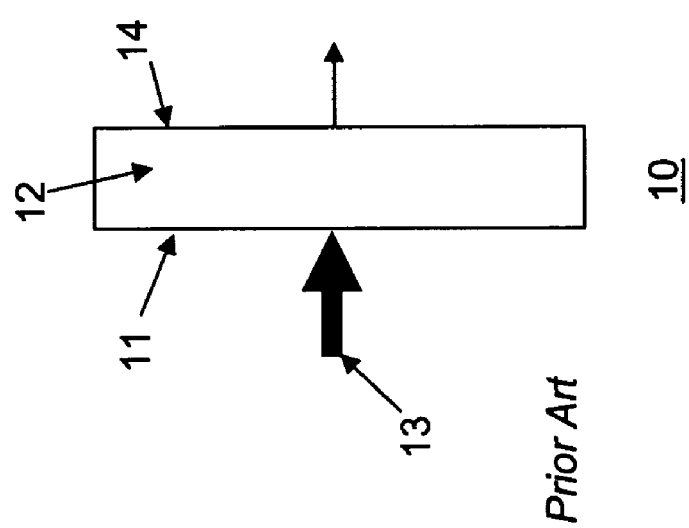
FIG. 1 shows a prior art illustration of a Fabry-Perot filter.
Figure 3:
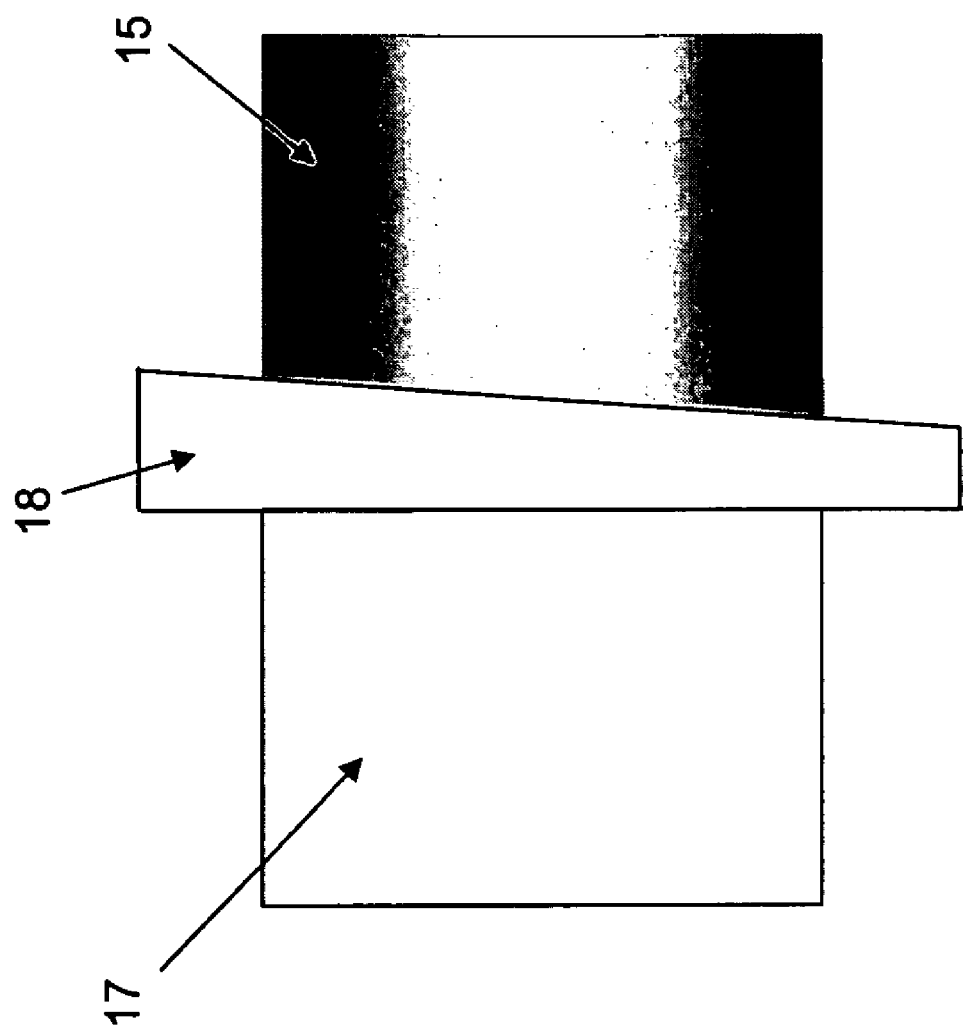
FIG. 3 illustrates a prior art linear variable filter made from a Fabry-Perot etalon of linearly increasing thickness.
Figure 4A:
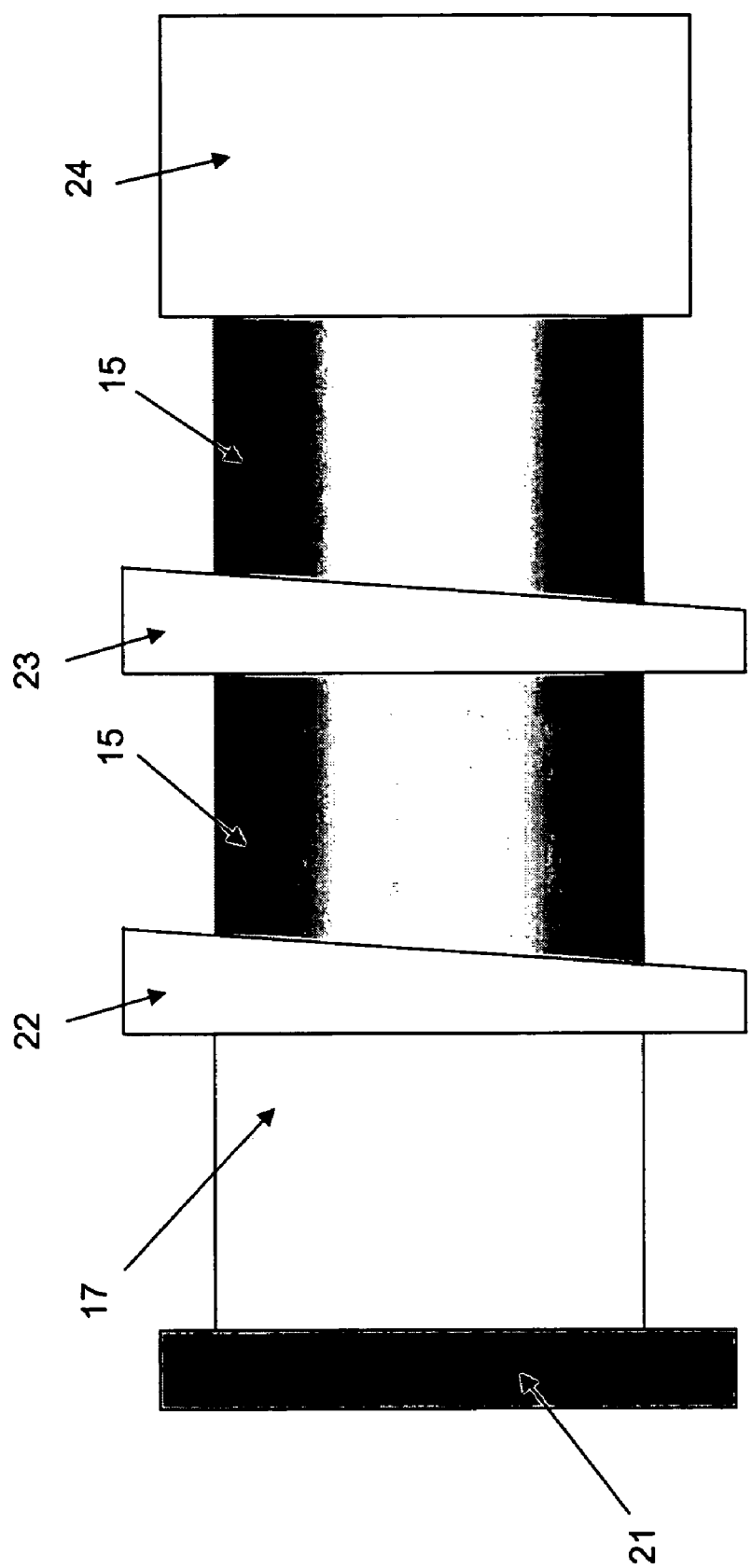
FIG. 4 illustrates a) one embodiment of the device of the present invention with white light incident on the aligned filters b) a second embodiment with unaligned filters, and c) a third embodiment where monochromatic low intensity light impacts the first filter.
Figure 4B:
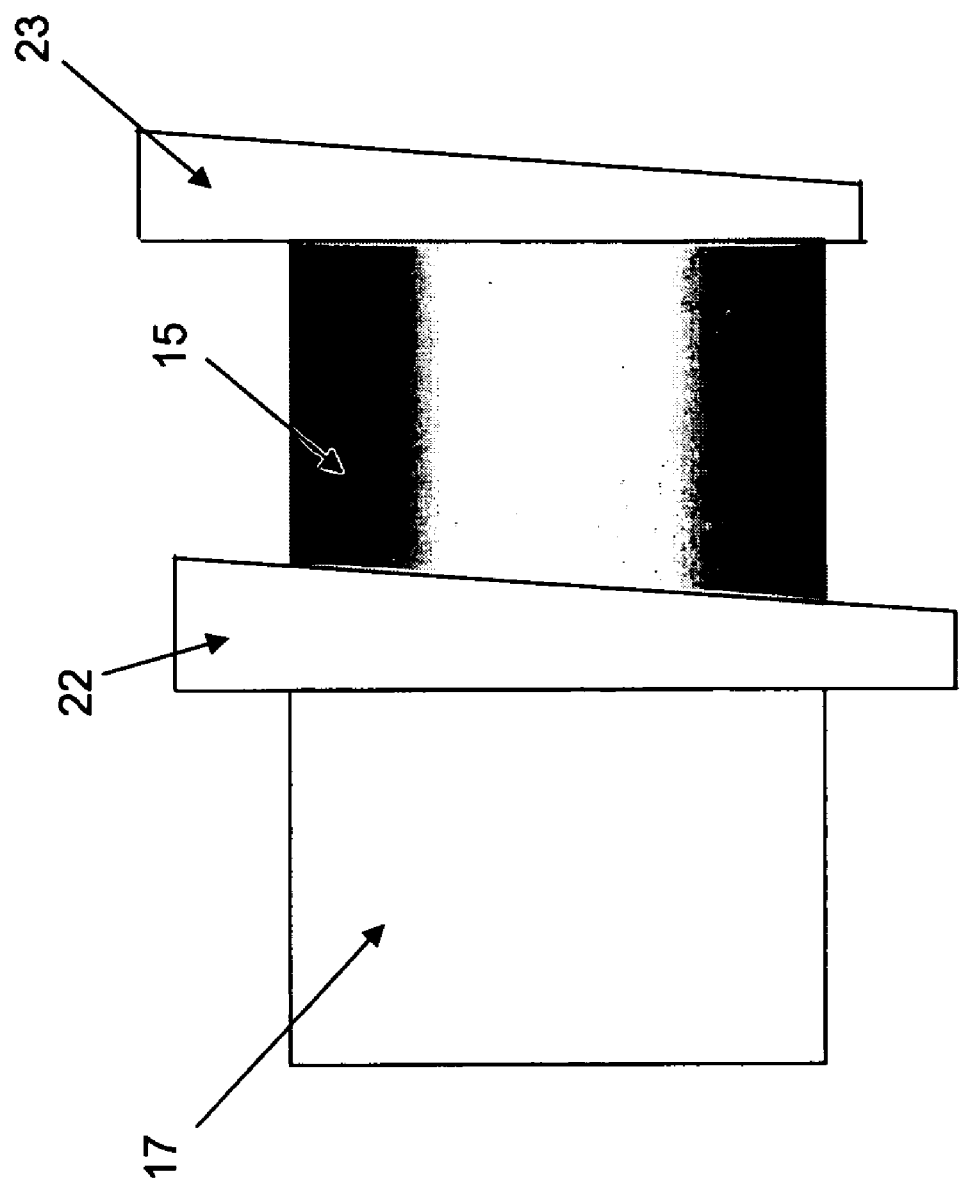
Figure 4C:
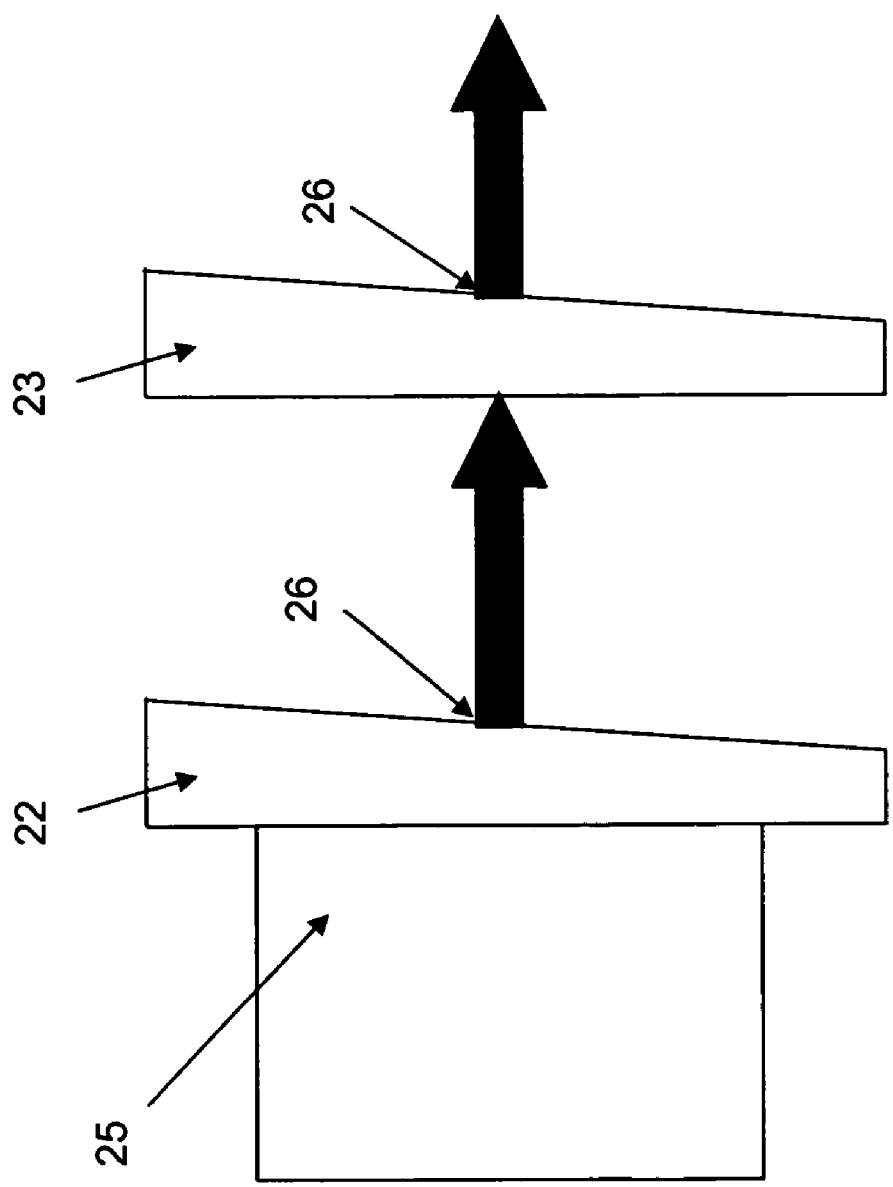

In one embodiment of the present invention, two linear variable filters are sequentially combined such that the spatial location of any specific resonance is aligned between the two filters. One filter has a linear dielectric and the other filter has a nonlinear dielectric. If the two filters are properly aligned spatially, light, such as white light 17, from a source 21 is incident upon the first filter 22 and is mostly reflected except for a rainbow of colors 15 transmitted through the filter 22, incident upon the second filter 23. The second filter can be aligned such that the rainbow of colors 15 will be transmitted efficiently through the second filter 22 to the optical sensor 24, as illustrated in FIG. 4a. The second filter 23 can also be aligned such that the rainbow of colored light 15 passed by the first filter 22 is blocked by the second filter 23, as illustrated in FIG. 4b. A monochromatic low intensity laser 25 hitting the assembly of two filters, 22 and 23, will pass through but only at one spatial location 26, as shown in FIG. 4c. The light is blocked at all other locations.

Figure 5:
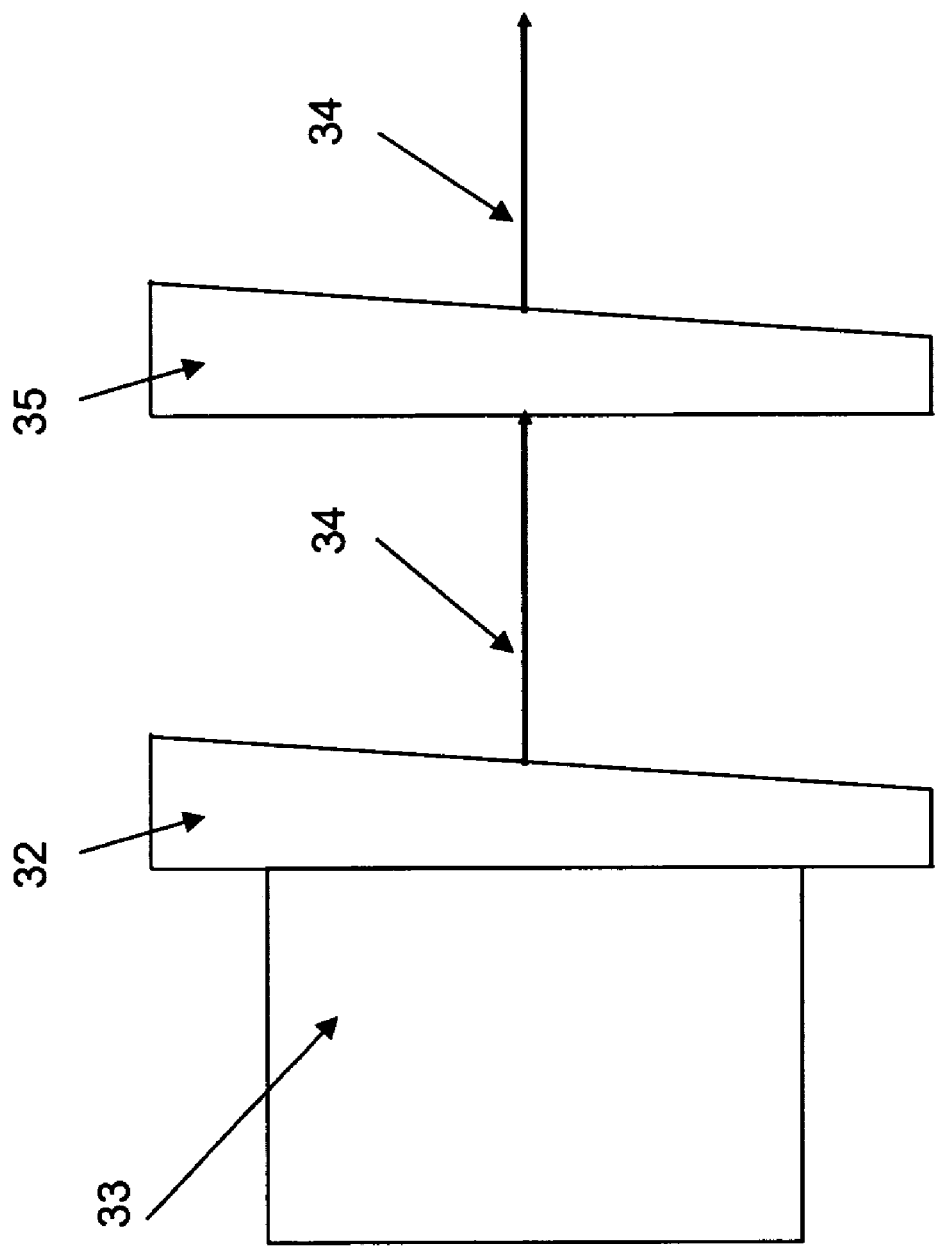
FIG. 5 illustrates an embodiment where high intensity white light impacts the nonlinear first filter.

In another embodiment using two linear variable filters as illustrated in FIG. 5, the first filter 32 having a nonlinear dielectric material, a high intensity laser light 33 (monochromatic) with a wavelength resonant with the nonlinear dielectric material, activates the nonlinear dielectric material in filter 32, thereby changing the refractive index of the material and essentially blocking the laser light from being transmitted through the first filter. A small amount of the light 34 leaks through the first filter and then leaks through the second linear filter 35.

Figure 6:
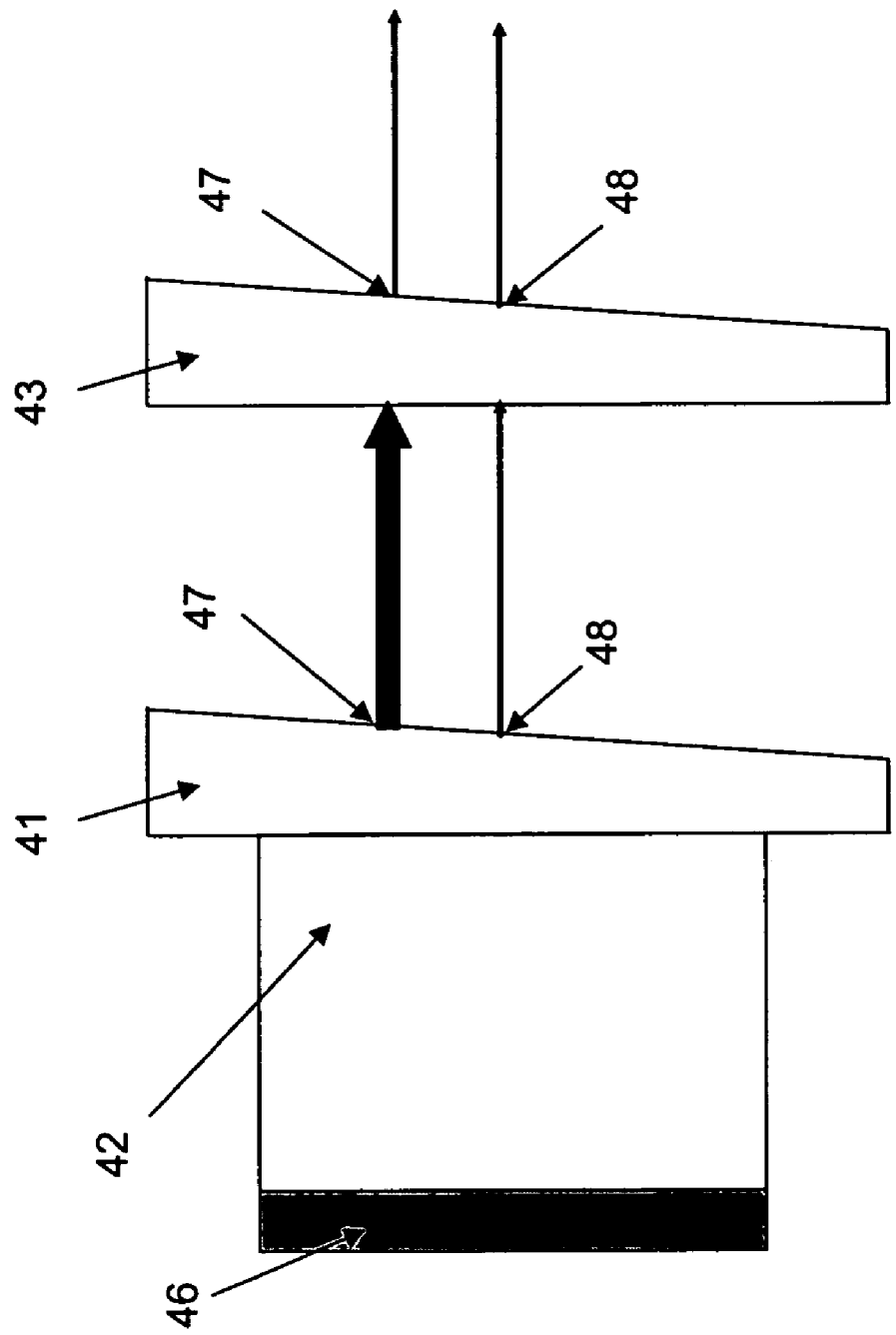
FIG. 6 illustrates an embodiment where monochromatic high intensity light impacts the first filter.

The assembly of filters can be designed so that the first filter has a nonlinear dielectric constant with a first resonant wavelength and, when the high intensity laser impacts the filter, changes the nonlinear index of refraction such that the filter now is resonant with the laser light at a different location on the filter (at a second resonant wavelength) and can now pass the light through the area where the light is now resonant. The second filter, designed with a material resonant with the first resonant wavelength can be so aligned such that the light at the second resonant wavelength does not efficiently pass through the second filter, as illustrated in FIG. 6. For example, if the first filter 41 is designed to pass green light 42 from a laser source 46, the high intensity laser light 42 can alter the material characteristics of the first filter 41 such that green light 42 passes through the original blue-green location (that is, the location corresponding to the resonance wavelength) 47, with a small fraction of light passing through at other locations 48. However, the second filter 43 with a linear dielectric constant resonant with green light blocks the light at the green-blue location, thus permitting only a small fraction of green light through the second filter at each of the two locations shown 47 and 48.

In the device of the present invention, multiple filters can be used to limit or control the intensity and wavelengths of light transmitted through the filters. Each filter can comprise a nonlinear dielectric or linear dielectric material. For example, in a two-filter system, the first filter can utilize a nonlinear dielectric material and the second a linear dielectric material or alternatively, the first can utilize a linear dielectric material and the second a nonlinear dielectric material, or both can utilize nonlinear dielectric materials.

The device can be used in a scanned imaging system; for example, a linear scanning, pushbroom or time-delay and integrate system. In a pushbroom type imager, the imager platform motion causes the image to slide across the imaging frame, where the pushbroom imager generally has an optical lens through which a line image is detected simultaneously perpendicular to the flight direction. As opposed to an optical mechanical scanner which scans and records mechanically pixel by pixel, the pushbroom scanner scans and records electronically line by line. If the image being recorded is moved across the frame at the same rate, all of the colors for a given part of the image add up in the proper location, referred to as time delay integration. Time delay integration is a standard technique used in photo reconnaissance systems as well as for some astronomical telescopes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An optical safeguard device, comprising:
   a first linear variable Fabry-Perot filter aligned approximately parallel to a second linear variable Fabry-Perot filter, at least one of said filters comprising a nonlinear dielectric constant material said nonlinear dielectric constant material being thicker at one end of the material than the other end; and
   an optical sensor aligned to directly receive light transmitted through said second filter, thereby providing optical limiting of said transmitted light.

2. The optical safeguard device of claim 1 wherein said first fitter comprises a nonlinear dielectric constant material and said second filter comprises a linear dielectric constant material.

3. The optical safeguard device of claim 1 wherein said first filter comprises a linear dielectric constant material and said second filter comprises a nonlinear dielectric constant material.

4. The optical safeguard device of claim 1 wherein said optical sensor is a charge-coupled device.

5. The optical safeguard device of claim 1 further comprising a light source aligned to transmit light through said first linear variable Fabry-Perot filter.

6. The optical safeguard device of claim 5 wherein said light is produced from a monochromatic light source capable of a light intensity sufficient to alter the nonlinear dielectric constant material.

7. The optical safeguard device of claim 5 wherein said light is produced from a white light source capable of a light intensity sufficient to alter the nonlinear dielectric constant material.

8. The optical safeguard device of claim 1 incorporated into an imaging system on a moving platform.

9. An optical safeguard device, comprising:
   a tight source capable of producing a high-intensity white light;
   a first linear variable Fabry-Perot filter aligned approximately orthogonal to said white light, said first linear variable Fabry-Perot filter comprising a nonlinear dielectric constant material said nonlinear dielectric constant material being thicker at one end of the material than the other end;
   a second linear variable Fabry-Perot filter aligned approximately parallel to said first linear variable Fabry-Perot filter; and
   an optical sensor aligned to directly receive light transmitted from said second linear variable Fabry-Perot filter, thereby providing optical limiting of said transmitted light.

10. The optical safeguard device of claim 9 wherein said optical sensor is a charge coupled device.

* * * * *